United States Patent [19]

Uedaira et al.

[11] Patent Number: 4,595,580
[45] Date of Patent: Jun. 17, 1986

[54] METHOD FOR MANUFACTURING FINE POWDER OF BARIUM ZIRCONATE

[75] Inventors: Satoru Uedaira; Masayuki Suzuki, both of Yokohama; Hiroshi Yamanoi, Hiratsuka; Hidemasa Tamura, Yokohama, all of Japan

[73] Assignee: Sony Corporation, Tokyo, Japan

[21] Appl. No.: 560,387

[22] Filed: Dec. 12, 1983

[30] Foreign Application Priority Data

Dec. 15, 1982 [JP] Japan ................ 57-219540

[51] Int. Cl.$^4$ ............................................. C01F 11/00
[52] U.S. Cl. ..................... 423/593; 423/85; 423/636
[58] Field of Search .............. 501/135; 423/593, 84, 423/71, 85, 636; 252/62.3 BT, 62.9 R

[56] References Cited

U.S. PATENT DOCUMENTS

| | | | |
|---|---|---|---|
| 3,330,697 | 7/1967 | Pechini | 423/593 |
| 4,374,117 | 2/1983 | Arendt | 423/593 |

FOREIGN PATENT DOCUMENTS

| | | | |
|---|---|---|---|
| 58-2220 | 1/1983 | Japan | 423/593 |
| 954089 | 4/1964 | United Kingdom | 423/593 |
| 165686 | 10/1964 | U.S.S.R. | 423/593 |

Primary Examiner—William R. Dixon, Jr.
Assistant Examiner—Steven Capella
Attorney, Agent, or Firm—Hill, Van Santen, Steadman & Simpson

[57] ABSTRACT

A method of manufacturing fine powder of $BaZrO_3$ is described, in which a zirconium compound is first hydrolyzed. The hydrolyzed zirconium compound is then reacted with a water-soluble barium compound in a strongly alkaline solution having a pH not lower than 13.6.

7 Claims, 7 Drawing Figures

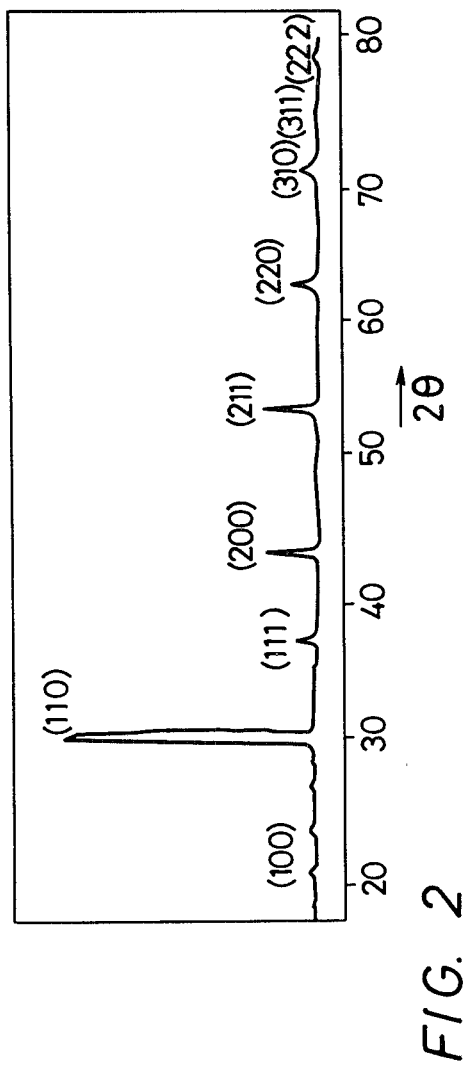
FIG. 1
FIG. 2
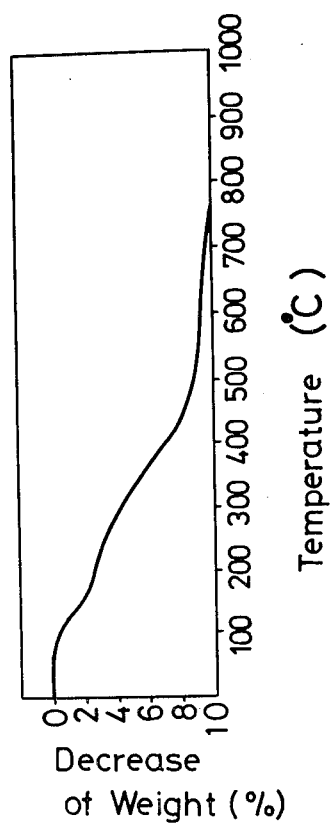
FIG. 3

4,595,580

METHOD FOR MANUFACTURING FINE POWDER OF BARIUM ZIRCONATE

BACKGROUND OF THE INVENTION

1. Field of the Invention

This invention relates to a method for manufacturing fine powder of barium zirconate, $BaZrO_3$.

2. Description of the Prior Art

In recent years, manufacture of super fine powder or particles of $BaZrO_3$ has been demanded from various fields. One of the field is concerned with multilayer ceramics. In capacitors, it is desirable that they are small in size and light in weight similar to other electronic parts, coupled with high capacitance. For the purposes, attention has been drawn to multilayer ceramic capacitors, which make use of $BaZrO_3$ as a dielectric material. In order to provide a thin and uniform layer of the material, formation of super fine powder of $BaZrO_3$ is demanded. For the manufacture of the multilayer ceramic capacitor, lead is ordinarily incorporated so as to improve the firing property and temperature characteristics. If too high a firing temperature is used, part of the lead is evaporated. Thus it becomes difficult to obtain a multilayer ceramic capacitor of uniform characteristics. In this connection, finer powder of $BaZrO_3$ permits lower firing temperatures and thus it is needed to make super fine powder of $BaZrO_3$.

Super fine powder of $BaZrO_3$ is very desirous as an electrostrictive or piezoelectric material because of improvements of characteristics. Super fine powder of $BaZrO_3$ is also effective for use as a transparent ceramic material. This is because, as described above, if the powder size is smaller and more uniform, lower firing temperatures can be expected.

As is well known in the art, it is the usual practice to manufacture $BaZrO_3$ by solid phase reaction. In the reaction, barium carbonate ($BaCO_3$) and zirconium oxide, both in powder form, are mixed in a ball mill and subjected to the solid phase reaction at a temperature of 1400° to 1500° C. Thereafter, the reaction product is mechanically milled. Accordingly, the powder size is relatively large and is not uniform. In addition, $BaZrO_3$ is so hard as aluminium oxide, by which it takes a long time for the milling such as in a ball mill, leading to undesirable incorporation of impurities.

In recent years, attempts have been made to prepare fine powder of $BaZrO_3$ from metal alkoxides. However, this method is high in production cost and has not been put into practice yet.

SUMMARY OF THE INVENTION

It is an object of the present invention to provide an improved method of manufacturing very fine powder of barium zirconate which is uniform in size.

It is another object of the invention to provide a method of manufacturing fine powder of barium zirconate which has high surface activity.

It is a further object of the invention to provide a method of manufacturing fine powder of barium zirconate which can be fired at relatively low firing temperatures.

According to the present invention, there is provided a method of manufacturing fine powder of barium zirconate which comprises the step of:

hydrolyzing a zirconium compound; and reacting the hydrolyzed zirconium compound with a water-soluble barium compound in an aqueous alkaline solution having a pH not smaller than 13.6.

By the reaction, very fine powder of $BaZrO_3$ can be obtained. As will be understood from the above, the method of the invention is very simple and thus $BaZrO_3$ powder can be obtained inexpensively.

BRIEF DESCRIPTION OF THE DRAWINGS

FIG. 1 is an X-ray diffraction pattern of fine powder of $BaZrO_3$ obtained according to the present invention;

FIG. 2 is a photograph by a scanning electron microsope of fine powder of $BaZrO_3$ of the invention;

FIG. 3 is a graph showing the results of thermogravimetric analysis of the powder of the invention;

DETAILED DESCRIPTION AND PREFERRED EMBODIMENTS OF THE INVENTION

Figure 4:
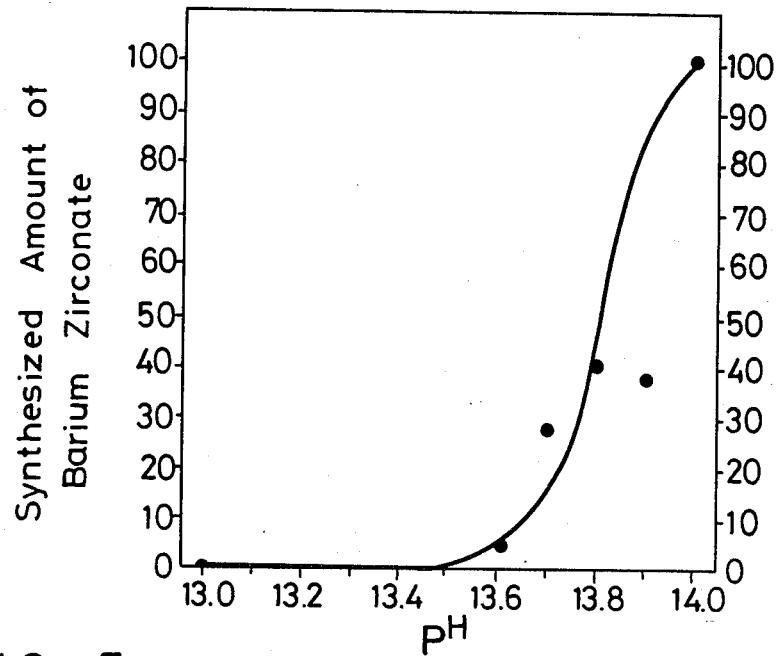
FIG. 4 is a graph showing pH dependence on the formation of fine powder of $BaZrO_3$ of the invention.

Zr compounds being hydrolyzed in the first step of the method according to the invention should be soluble in water and include, for example, $ZrCl_4$, $ZrOCl_2.H_2O$, $Zr(NO_3)_2.2H_2O$, $Zr(SO_4)_2$, $ZrO.SO_4$ and the like. For the hydrolysis, an aqueous solution of a zirconium compound such as $ZrCl_4$ is prepared, to which is added an alkaline substance such as $NH_4OH$, $NaOH$, $KOH$, $LiOH$ or the like to render the pH neutral. As a result, $ZrO_2.xH_2O$. In case where $Zr(SO_4)_2$ or $ZrO.SO_4$ is used, the hydrolyzed product should preferably be washed with water in order to remove the sulfate group therefrom and $ZrO_2.XH_2O$ is collected by filtration.

Subsequently, water-soluble Ba compounds are provided and reached with the hydrolyzate in an aqueous solution of strong alkali. If the removal of sulfate group in the hydrolysis reaction is not necessary, the reaction in the aqueous strongly alkaline solution may be effected simultaneously with the hydrolysis.

Examples of the water-soluble Ba compound include $BaO$, $Ba(OH)_2$, $Ba(OH)_2.8H_2O$, $BaCl_2$, $Ba(NO_3)_2$, $Ba(CH_3COO)_2$, $Ba(ClO_3)_2.2H_2O$, and the like. The alkalis used in the form of an aqueous solution include, for example, $LiOH$, $KOH$, $NaOH$, $NH_4OH$, and the like.

The pH of the aqueous strongly alkaline solution should be not less than 13.6, preferably not less than 13.7. In the reaction between the hydrolyzate and a Ba compound, a Ba/Zr molar ratio should be not smaller than 0.7:1, preferably 0.9–10:1. The reaction temperature is generally in the range of from 90° C. to the boiling point, preferably over 92° C. The reaction time should be sufficient to cause the reaction to proceed. For instance, it is 2 hours or more, preferably 3 hours or more.

After completion of the reaction, the reaction system may be filtered, washed with water and dried, if necessary.

According to the method of the present invention, the resulting powder of $BaZrO_3$ has a size as small as 2–3 microns and the powder is spherical in shape and uniform. The BaZrO$_3$ powder obtained by the method of the invention is highly active. For the preparation of BaZrO$_3$ powder by known solid phase reaction, the product is mechanically milled or powdered, so that a uniform and small powder size as attained by the present invention cannot be expected. Where the fine powder of BaZrO$_3$ obtained by the present invention is applied as a multilayer ceramic capacitor, sintering temperatures can be lowered to an extent, so that lead can be uniformly contained in the layer. By this, scatterings of characteristics can be reduced. Use of the fine powder of BaZrO$_3$ results in a great dielectric constant of a capacitor itself at a normal temperature. The fine powder is very suitable as an electrostrictive, piezoelectric or transparent ceramic material.

In the method of the invention, all the starting materials are inorganic materials and the production cost of the BaZrO$_3$ powder can be reduced to a low level.

The method of the invention needs no milling step as is required in the known method using solid phase reaction, thus involving little or no incorporation of impurities.

The BaZrO$_3$ powder obtained by the present invention is cubic in crystal form ($a_o$=4.215 angstrom).

The present invention is described in more detail by way of examples.

EXAMPLE 1

55.74 g of ZrCl$_4$ was dissolved in water to make 500 ml of an aqueous solution. 40 ml of the solution was taken, in which was dissolved 5.001 g of Ba(NO$_3$)$_2$ so that a molar ratio of Ba$^{+2}$/Zr$^{+4}$ was 1. Thereafter, KOH was added to the solution to adjust the pH to 14, whereupon the solution was converted to an opaque suspension. The suspension was heated for reaction at 100° C. for 7 hours while agitating. The resulting white precipitate was repeatedly washed by decantation with hot water to remove impurities such as alkali ions, followed by separation by filtration and drying in a dryer of 90° C.

The product was subjected to the X-ray diffraction analysis with a diffraction pattern shown in FIG. 1. This pattern was compared with ASTM card (6-0399) to determine the product as BaZrO$_3$ of the cubic perovskite structure. The X-ray diffraction was carried out by a powder method using a copper target, a nickel filter and a time constant of 1. As is shown in a photograph of a scanning electron microscope of FIG. 2, the powder of BaZrO$_3$ had a uniform size of 2 to 3 microns. The powder was in spherical form.

Moreover, the fine powder of BaZrO$_3$ obtained in this example was subjected to the thermogravimetric analysis. The results are shown in FIG. 3, from which it will become apparent that the fine powder of BaZrO$_3$ contains no impurities. The gradual weight loss is considered to result from the removal of adsorbed water.

EXAMPLE 2

82.55 g of ZrOCl$_2$.8H$_2$O was dissolved in water to make 500 ml of a solution. 40 ml of the solution was taken, to which was added 6.465 g of Ba(OH)$_2$.8H$_2$O so that a molar ratio of Ba/Zr was 1. In the case, the mixture became opaque because it was not strongly acidic as in Example 1. The suspension was adjusted in pH to 14 by the use of NaOH and agitated for reaction for 7 hours while boiling. The reaction system was subjected to decantation, filtration and drying in the same manner a in Example 1, thereby obtaining intended fine powder of BaZrO$_3$.

The fine powder was used for the X-ray diffraction in the same manner as in the foregoing example, with a diffraction pattern similar to the pattern of FIG. 1. The results of the scanning electron microscopic observation were similar to those of FIG. 2.

EXAMPLE 3

55.74 g of ZrCl$_4$ was dissolved in water to make 500 ml of a solution. 40 ml of the solution was taken, to which was added a LiOH solution for hydrolysis so that pH=7. By this, a white suspension was obtained, to which was added 9.054 g of Ba(OH)$_2$.8H$_2$O (Ba/Zr=1.5), followed by further adding LiOH for adjustment of pH to 14. The mixture was reacted at 98° C. for 8 hours, followed by decantation, filtration and drying in the same manner as in Example 1.

The resulting powder was subjected to the X-ray diffraction analysis with a diffraction pattern similar to the pattern of FIG. 1 being obtained. The results of observation by the scanning electron microscope were similar to those of FIG. 2.

EXAMPLE 4

In this example, the pH dependence on the amount of produced BaZrO$_3$ was determined. The procedure of Example 1 using a reaction temperature of 100° C., a Ba/Zr molar ratio of 1 and a reaction time of 7 hours was repeated except that the pH was varied. Under these conditions, an amount of BaZrO$_3$ was determined. The results are shown in FIG. 4. From the figure, it will be seen that the pH is generally not lower than 13.6, preferably not lower than 13.7. It will be noted that the amount of produced BaZrO$_3$ was calculated from an area of the X-ray diffraction peak (110) of the cubic perovskite structure. The X-ray diffraction analysis was conducted under similar conditions indicated before, using a copper target, a cobalt filter, 35 KV, 25 mA and a time constant of 1.

EXAMPLE 5

In this example, the dependence of molar ratio on the amount of produced BaZrO$_3$ was determined.

Figure 5:
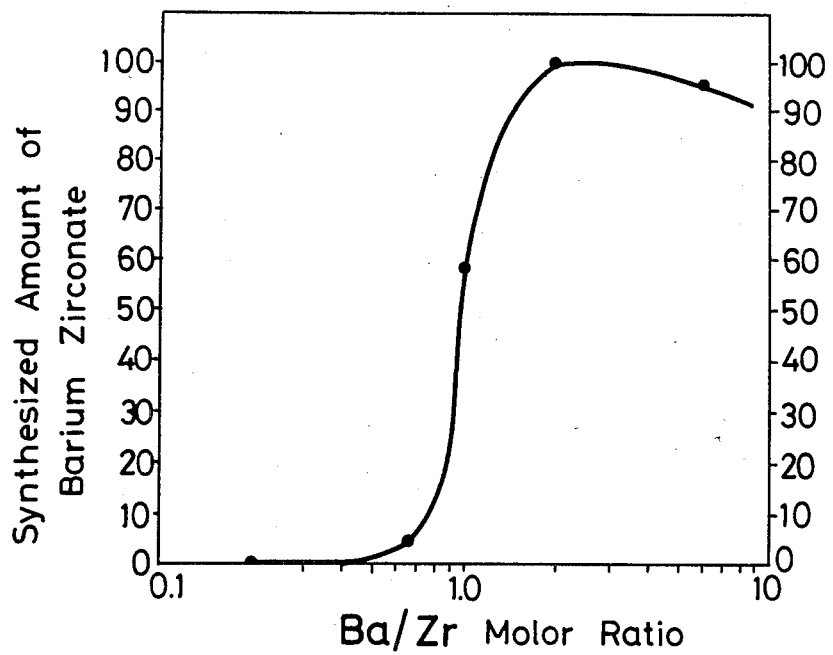
FIG. 5 is a graph showing the dependence of Ba/Zr molar ratio on the formation of fine powder of $BaZrO_3$ of the invention.

The procedure of Example 1 was repeated except that the molar ratio of Ba/Zr was varied, thereby producing BaZrO$_3$. The amount of produced BaZrO$_3$ is shown in FIG. 5 in relation to the molar ratio. From the figure, it will be seen that the Ba/Zr molar ratio is not smaller than 0.7:1, preferably 0.9 to 10:1. The amount of BaZrO$_3$ was determined in the same manner as in Example 4.

EXAMPLE 6

Figure 6:
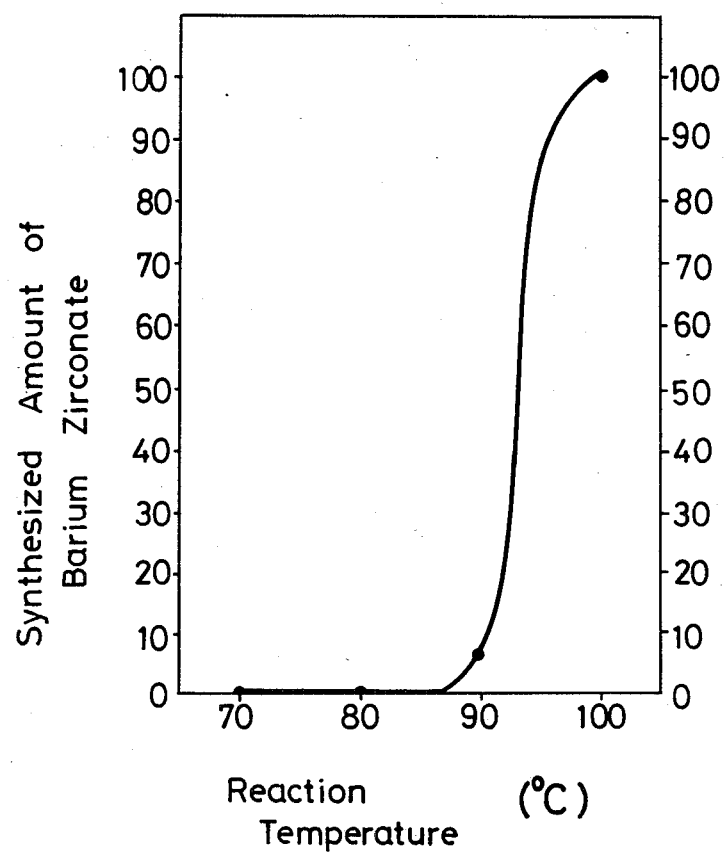
FIG. 6 is a graph showing the dependence of reaction temperature on the formation of fine powder of $BaZrO_3$ of the invention.

In this example, the temperature dependence on the amount of produced BaZrO$_3$ was determined. The procedure of Example 1 was repeated except that the reaction temperature was varied. The amount of produced BaZrO$_3$ is shown in FIG. 6. The results of the figure reveal that the reaction temperature is not lower than 90° C., preferably not lower than 92° C. The amount of BaZrO$_3$ was determined in the same manner as in Example 4.

EXAMPLE 7

Figure 7:
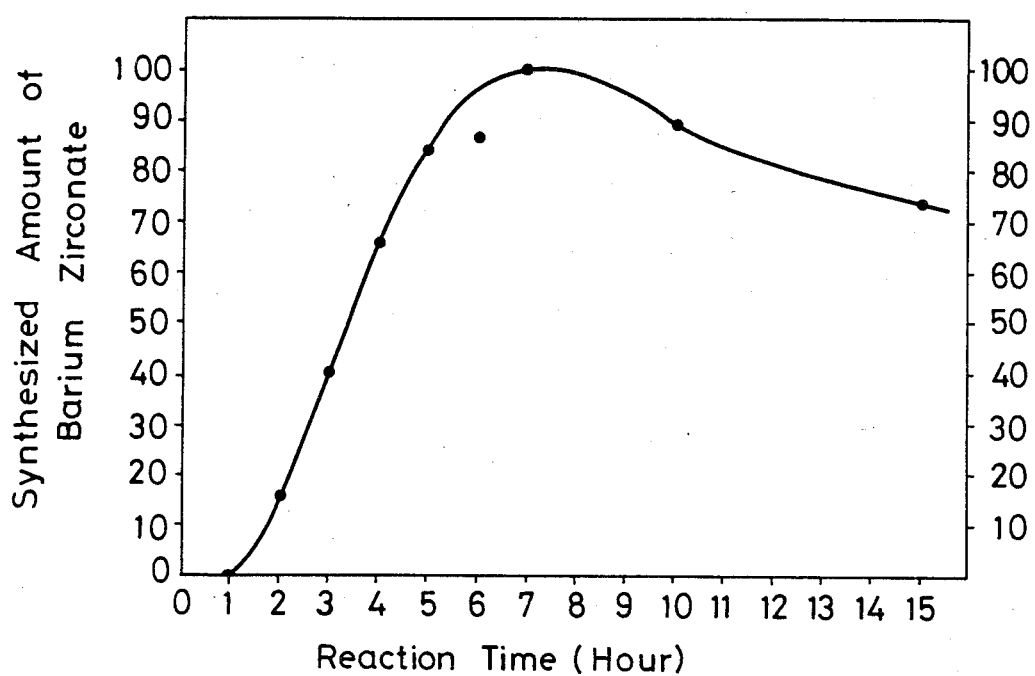
FIG. 7 is a graph showing the dependence of reaction temperature on the formation of fine powder of $BaZrO_3$ of the invention.

In this example, the dependence of reaction time on the amount of produced BaZrO$_3$ was determined. The general procedure of Example 1 was repeated except that the reaction time was varied. The amount of produced $BaZrO_3$ is as shown in FIG. 7. From the figure, it will be seen that the reaction time is not less than 2 hours, preferably not less than 3 hours.

What is claimed is:

1. A method of manufacturing fine powder of barium zirconate which comprises the steps of:

hydrolyzing an inorganic zirconium compound to produce a hydrolysate; and reacting the hydrolysate thus produced with a water-soluble barium compound in an aqueous alkaline solution having a pH not lower than 13.6, and at a temperature not lower than 90° C., to produce said barium zirconate directly.

2. A method according to claim 1, wherein the pH is not lower than 13.7.

3. A method according to claim 1, wherein the reaction between the hydrolyzed zirconium compound and the water-soluble barium compound is effected in a Ba-to-Zr molar ratio not smaller than 0.7:1.

4. A method according to claim 3, wherein the molar ratio is in the range of 0.9–10:1.

5. A method according to claim 1, wherein the temperature is in the range of 92° C. to a boiling point of reaction system.

6. A method according to claim 1, wherein said zirconium compound is a member selected from the group consisting of $ZrCl_4$, $ZrOCl_2.8H_2O$, $Zr(NO_3)_4$, $ZrO(NO_3)_2.2H_2O$, $Zr(SO_4)_2$, and $ZrOSO_4$.

7. A method according to claim 1, wherein said barium compound is a member selected from the group consisting of $BaO$, $Ba(OH)_2$, $Ba(OH)_2.8H_2O$, $BaCl_2$, $Ba(NO_3)_2$, $Ba(CH_3COO)_2$, and $Ba(ClO_3)_2.2H_2O$.

* * * * *